UNITED STATES PATENT OFFICE 2,670,392

POLYMERIZATION OF OLEFINS

William F. Glassmire, Groves, and James H. Phillips, Port Arthur, Tex., assignors to The Texas Company, New York, N. Y., a corporation of Delaware No Drawing. Application April 19, 1950,
Serial No. 156,939

2 Claims. (Cl. 260—683.15)

This invention relates to the polymerization of certain olefins in the presence of sulfuric acid and is concerned with the polymerization of normally liquid olefins boiling generally within the gasoline boiling range to produce higher boiling polymer products adapted for lubricating oil additives and for the preparation of detergents. The invention contemplates a process wherein the polymer products from the polymerization of $C_3$ and $C_4$ olefins are subjected to polymerization in contact with sulfuric acid and in the presence of low boiling isoparaffin.

We have discovered that when these liquid olefin polymers are contacted with sulfuric acid in the presence of minor amounts of the low boiling isoparaffin in relation to the olefin content the isoparaffin appears to act as a promoter of polymerization and the predominating reaction is one of polymerization with little or no alkylation taking place. The presence of the isoparaffin, moreover, effects a reduction in acid consumption. To assure an essentially polymerizing reaction the low boiling isoparaffin is used generally in a molar ratio of isoparaffin to olefin of less than 1:1 and preferably in molar ratios of from 0.2–0.5:1.

In order to obtain the exclusive polymerizing reaction strong sulfuric acid should be used such as acid with 85–99% $H_2SO_4$, the stronger acid producing the heavier products and giving the best product yield. Low temperatures promote the tendency to the formation of heavier products. In general the temperature should not exceed about 70° F. and preferably should be about 40° F. or even lower. The time of contacting of the olefin with the acid should be ample to insure the formation of the high boiling polymers; olefin space velocities of about 0.2–1.0 liquid volume per volume of catalyst per hour provide a satisfactory time element. With this combination of conditions, strong acid, low temperatures, low space velocities and minor concentration of the low boiling isoparaffin, the reaction proceeds essentially as one of polymerization and effects the production of high yields of olefin polymer products.

The polymer products from the polymerization of propylenes and butylenes constitute suitable charging stocks for the polymerizing reaction.

In typical operations conducted in accordance with the invention light and heavy fractions obtained by the phosphoric acid polymerization of propylene and an isobutylene trimer fraction obtained from the phosphoric acid polymerization of isobutylene, were contacted with sulfuric acid under conditions to effect polymerization into products containing large proportions of olefinic material boiling above 500° F. In these runs the temperature in the reactor in which the olefin polymers were contacted with sulfuric acid in the presence of isobutane was 40° F. under a pressure of 80 p. s. i. g. The acid strength of the charge acid was 97.2% $H_2SO_4$. The molar ratio of isoparaffin to olefin was 0.2:1 and the olefin space velocity was 0.3 v./v./hr. The following table gives pertinent data with respect to the three runs:

|  | Run A | Run B | Run C |
|---|---|---|---|
| Charge | Light Propylene Polymer | Heavy Propylene Polymer | Isobutylene Trimer. |
| Boiling Range | 188–302° F | 340–481° F | 340–402° F. |
| Bromine No | 126 | 97 | 100. |
| Unsaturates | 94% | 92% | 93%. |
| System Acid Strength | 67.7% | 60.4 | 67.8%. |
| Acid Consumption, lbs. per gal | 1.8 | 2.9 | 2.0. |
| Product: |  |  |  |
|   Yield, by wt. basis olefin charge | 80.0% | 59.7% | 72.4%. |
|   Bromine No | 66 | 57 | 71. |
|   Unsaturates | 92% | 88% | 86%. |
|   Dist. (A. S. T. M.)— |  |  |  |
|     20% | 359° F | 400° F | 382° F. |
|     30% | 441° F | 428° F | 402° F. |
|     40% | 494° F | 484° F | 426° F. |
|     50% | 510° F | 558° F | 455° F. |
|     60% | 527° F | 584° F | 480° F. |
|     70% | 546° F | 600° F | 506° F. |
|     80% | 573° F | 616° F | 536° F. |
|     90% | 620° F | 636° F | 575° F. |
|     E. P. | 642° F | 646° F | 614° F. |
| Isoparaffin Reacted | 0 | 2% | 6% |
| Product Fractions | Boiling 510–560° F | Boiling 575–625° F | Boiling 470–550° F. |
|   Volume [1] | 22.9% | 16.2% | 16.7%. |
|   Bromine No | 53 | 41 | 63. |
|   Kinematic Vis. at 100° F | 4.56 | 10.68 | 5.25. |
|  | Boiling 560–625° F | Boiling 625° F.+ | Boiling 550–625° F. |
|   Volume [1] | 20% | 27.4% | 16%. |
|   Bromine No | 50 | 46 | 51. |
|   Kinematic Vis. at 100° F | 10.86 | 25.10 | 14.06. |

[1] By precision fractionation under a vacuum above 430° F. and based on total stabilized product.

In an operation without the presence of the isoparaffin a light $C_3$ polymer of 290° F. end point was treated with a 1:1 dosage of sulfuric acid of 84% strength, producing a product containing about 90% boiling above the end point of the charge. The stock treated was very similar to the stock treated in run A and it would be expected that by reason of the weaker acid used (84% as compared to 97.2% in run A) the acid consumption would be less than in run A. However, the acid consumption was 4.3 pounds per gallon. Thus the effectiveness of the isoparaffin in reducing acid consumption is clearly evident.

Although a preferred embodiment of the invention has been described herein, it will be understood that various changes and modifications may be made therein, while securing to a greater or less extent some or all of the benefits of the invention, without departing from the spirit and scope thereof.

We claim:

1. The method of producing higher boiling olefin polymers from a charge of olefin polymers boiling essentially within the gasoline boiling range that comprises contacting the olefin polymers with strong sulfuric acid at a low temperature not exceeding about 70° F. in the presence of a proportion of isoparaffin lower boiling than the charge in a ratio of isoparaffin to olefin of the order of 0.2–0.5:1 and with an olefin space velocity of about 0.2–1.0 liquid volume per volume acid per hour to thereby effect reactions involving essentially polymerization to form higher boiling olefin polymers.

2. The method of producing higher boiling olefin polymers from the olefin polymer products, boiling in the gasoline boiling range, of the polymerization of olefins of the class of $C_3$ and $C_4$ olefins that comprises contacting such olefin polymer products with strong sulfuric acid at a low temperature not exceeding about 70° F. in the presence of a proportion of isoparaffin lower boiling than said polymer products in a ratio of isoparaffin to olefin of the order of 0.2–0.5:1 and with an olefin space velocity of about 0.2–1.0 liquid volume per volume acid per hour to thereby effect reactions involving essentially polymerization to form higher boiling olefin polymers.

WILLIAM F. GLASSMIRE.
JAMES H. PHILLIPS.

References Cited in the file of this patent

UNITED STATES PATENTS

| Number | Name | Date |
|---|---|---|
| 2,401,865 | Gorin et al. | June 11, 1946 |
| 2,472,494 | Slotterbeck | June 7, 1949 |
| 2,494,510 | Hughes et al. | Jan. 10, 1950 |

FOREIGN PATENTS

| Number | Country | Date |
|---|---|---|
| 804,591 | France | Oct. 27, 1936 |
| 518,054 | Great Britain | Feb. 15, 1940 |